No. 795,210.

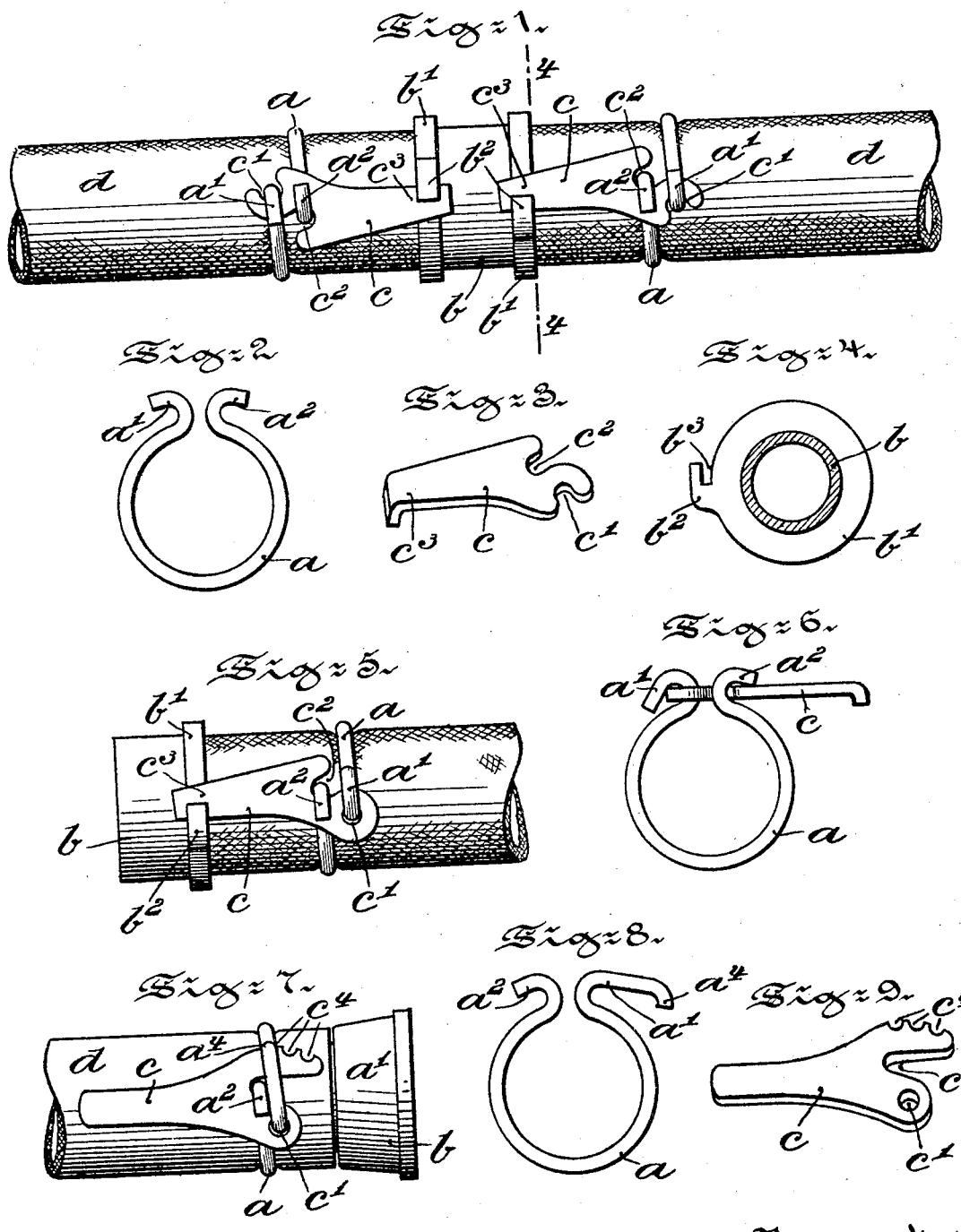

Patented July 18, 1905.

UNITED STATES PATENT OFFICE.

HARRY N. EVANS, OF PHILADELPHIA, PENNSYLVANIA, ASSIGNOR OF ONE-HALF TO FRANK DE WITT MORRIS.

HOSE-CLAMP.

SPECIFICATION forming part of Letters Patent No. 795,210, dated July 18, 1905.

Application filed December 14, 1904. Serial No. 236,809.

*To all whom it may concern:*

Be it known that I, HARRY N. EVANS, a citizen of the United States, residing at Philadelphia, in the county of Philadelphia and State of Pennsylvania, have invented certain new and useful Improvements in Hose-Clamps, of which the following is a specification.

My invention has relation to a hose-clamp by means of which a hose is secured to a coupling or similar device, and in such connection it has particular relation to the arrangement and construction of such a clamp.

The principal object of my invention is to provide a clamp for securing the end of a hose to a coupling which shall be simple in construction and cheap to manufacture; and to such end it consists, essentially, of a band of wire adapted to encircle the hose, a lever adapted to tighten the band around the hose, and means to lock and hold the lever when the band is drawn sufficiently tight.

The nature and scope of my invention will be more fully understood from the following description, taken in connection with the accompanying drawings, forming part hereof, in which—

Figure 1 is a top or plan view of a hose-coupling having the two ends of hose secured thereto by means of clamps embodying the main features of my invention. Fig. 2 is an elevational view of the wire band shown in Fig. 1. Fig. 3 is a perspective view of the lever for tightening the wire band of Figs. 1 and 2. Fig. 4 is a cross-section of the coupling of Fig. 1, taken on the line 4 4 of Fig. 1. Figs. 5 and 6 are views showing a modified form of band and lever in which the same are secured to each other so as to form a unitary structure. Fig. 7 is a top or plan view of a form of clamp adapted for use with the ordinary form of coupling. Figs. 8 and 9 are, respectively, views of the band and lever shown in Fig. 7.

Referring to the drawings, $a$ is a band or wire adapted to encircle the hose and clamp the same to the usual barrel or tube (not shown) of the coupling $b$. The free ends of the band $a$ are bent back, as at $a'$ and $a^2$, to form hooks adapted to be engaged by the fulcral recesses or openings $c'$ and $c^2$ of a plate-lever $c$, which serves to tighten the wire band around the hose $d$ and securely clamp to the barrel or tube of the coupling. Each member of the coupling $b$ is provided with an annular shoulder $b'$, having a projection $b^2$, notched, as at $b^3$, to receive the free end $c^3$ of the lever $c$ to lock the same when the band $a$ is tightened around the hose $d$. It will be understood that any desired tension of the band may be obtained by different initial circumferential positions of the hooks $a'$ and $a^2$ with respect to the notched projection $b^2$, to thereby cause the lever $c$ to assume more or less angular positions when the same is locked.

In Figs. 5 and 6 there is shown a modified form of band and lever in which the fulcral recess or opening $c'$ of the lever $c$ is made in the form of an eye, and the hook $a'$ of band $a$ is bent over, as clearly shown in Fig. 6, to keep the band and lever from becoming separated when detached from the hose.

In Figs. 7, 8, and 9 there is shown another form of clamp adapted for use with the ordinary type of coupling, in which, of course, the notched projection $b^2$ would not be present. To provide a means of locking the lever in this instance, the hook $a'$ is extended and bent downward, as at $a^4$, and the lever $c$ is provided with a series of notches $c^4$, into one of which the bent portion of $a^4$ can be hammered according to the degree of tension desired.

While the clamp has only been shown and described with reference to couplings, it will of course be understood the same can be used as well for other purposes—for example, as a hose-mender, in connection with a tube inserted in the hose.

Having thus described the nature and characteristic features of my invention, what I claim as new, and desire to secure by Letters Patent, is—

1. A hose-clamp comprising a band adapted to encircle the hose and having its free ends bent to form hooks, a lever having fulcral recesses adapted to engage the bent ends of the band, and means for locking said lever to hold the band tight around the hose.

2. A hose-clamp comprising a band adapted to encircle the hose and having its free ends bent to form hooks, a lever having fulcral recesses adapted to engage the bent ends of the band, and means for locking said lever to hold the band tight around the hose with varying degrees of tension as desired.

In testimony whereof I have hereunto signed my name in the presence of two subscribing witnesses.

HARRY N. EVANS.

Witnesses:
ANNA M. TOMLINSON,
JAS. C. WOBENSMITH.